US012811733B2

(12) United States Patent
Huang et al.

(10) Patent No.: US 12,811,733 B2
(45) Date of Patent: Nov. 24, 2026

(54) UE CAPABILITY TO ACTIVATE PRE-CONFIGURED MEASUREMENT GAP

(71) Applicant: Intel Products IP LLC, Santa Clara, CA (US)

(72) Inventors: Rui Huang, Beijing (CN); Ilya Bolotin, Nizhny-Novgorod (RU); Andrey Chervyakov, Maynooth (IE); Hua Li, Beijing (CN); Meng Zhang, Beijing (CN); Candy Yiu, Portland, OR (US); Youn Hyoung Heo, Sunnyvale, CA (US)

(73) Assignee: Intel Products IP LLC, Santa Clara, CA (US)

( * ) Notice: Subject to any disclaimer, the term of this patent is extended or adjusted under 35 U.S.C. 154(b) by 264 days.

(21) Appl. No.: 18/288,790

(22) PCT Filed: Aug. 16, 2022

(86) PCT No.: PCT/US2022/040440
§ 371 (c)(1),
(2) Date: Oct. 27, 2023

(87) PCT Pub. No.: WO2023/023037
PCT Pub. Date: Feb. 23, 2023

(65) Prior Publication Data

US 2024/0223323 A1 Jul. 4, 2024

Related U.S. Application Data

(60) Provisional application No. 63/297,995, filed on Jan. 10, 2022, provisional application No. 63/234,614, filed on Aug. 18, 2021.

(51) Int. Cl.
*H04L 5/00* (2006.01)

(52) U.S. Cl.
CPC .......... *H04L 5/0035* (2013.01); *H04L 5/0048* (2013.01); *H04L 5/0053* (2013.01); *H04L 5/0096* (2013.01)

(58) Field of Classification Search
CPC ... H04L 5/0035; H04L 5/0048; H04L 5/0053; H04L 5/0096; H04L 5/005; H04L 5/0098;
(Continued)

(56) References Cited

U.S. PATENT DOCUMENTS

2019/0394666 A1 12/2019 Li et al.
2022/0104059 A1* 3/2022 Hu ........................ H04W 24/10
(Continued)

FOREIGN PATENT DOCUMENTS

EP 4319258 2/2024
JP 2020532155 11/2020
(Continued)

OTHER PUBLICATIONS

"International Application Serial No. PCT/US2022/040440, International Search Report mailed Nov. 29, 2022", 3 pgs.
(Continued)

*Primary Examiner* — Jae Y Lee
*Assistant Examiner* — Nick Anon Sundara
(74) *Attorney, Agent, or Firm* — Schwegman Lundberg & Woessner, P.A.

(57) ABSTRACT

An apparatus and system for use of a pre-configured gap are described. The network signals a preconfigured gap via radio resource control (RRC) signaling and follows a bandwidth part (BWP) to activate/deactivate the gap upon BWP switching. The RRC signaling indicates whether a measurement gap is a pre-configured gap. Pre-configured frequency range 1 (FR1) and FR2 gaps are able to be configured simultaneously using RRC signaling. Similarly, legacy gaps and pre-configured gaps are able to be configured simultane-
(Continued)

ously using RRC signaling. The pre-configured gap may be autonomously or implicitly activated triggered by downlink control information (DCI) or timer-based BWP switching—in some cases under predetermined network conditions.

20 Claims, 6 Drawing Sheets

(58) Field of Classification Search
CPC .... H04L 5/001; H04W 36/0088; H04W 36/06
See application file for complete search history.

(56) References Cited

U.S. PATENT DOCUMENTS

2022/0322308 A1* 10/2022 He ...................... H04L 41/0896
2024/0172028 A1* 5/2024 Kazmi .............. H04W 36/0088

FOREIGN PATENT DOCUMENTS

| | | | |
|---|---|---|---|
| JP | 2021503754 | | 2/2021 |
| JP | 2021503782 | | 2/2021 |
| JP | 2024511527 | | 3/2024 |
| WO | 2019097432 | | 5/2019 |
| WO | WO-2020060952 | A1 | 3/2020 |
| WO | WO-2023023037 | A1 | 2/2023 |

OTHER PUBLICATIONS

"International Application Serial No. PCT/US2022/040440, Written Opinion mailed Nov. 29, 2022", 5 pgs.
Apple, "Consideration on preconfigured measurement gap patterns", R4-2100221, 3GPP TSG RAN WG4 Meeting #98-e, (Jan. 15, 2021), 6 pgs.
Intel Corporation, "Discussion on pre-configured measurement gap", R4-2113150, 3GPP TSG RAN WG4 Meeting #100-e, (Aug. 6, 2021), 13 pgs.
Nokia, et al., "Discussion on Pre-configured MG patterns", R4-2114063, 3GPP TSG RAN WG4 Meeting #100-e, (Aug. 6, 2021), 8 pgs.
VIVO, "Further views on pre-configured MG patterns", R4-2112639, 3GPP TSG RAN WG4 Meeting #100-e, (Aug. 6, 2021), 7 pgs.
"Japanese Application Serial No. 2023-578068, Notification of Reasons for Refusal mailed May 19, 2026", w English translation, 8 pgs.

* cited by examiner

UE CAPABILITY TO ACTIVATE PRE-CONFIGURED MEASUREMENT GAP

PRIORITY CLAIM

This application is a U.S. National Stage Filing under 35 U.S.C. 371 from International Application No. PCT/US2022/040440, filed Aug. 16, 2022 and published in English as WO 2023/023037 on Feb. 23, 2023, which claims the benefit of priority to U.S. Provisional Patent Application Ser. No. 63/234,614, filed Aug. 18, 2021, U.S. Provisional Patent Application Ser. No. 63/297,995, filed Jan. 10, 2022, each of which is incorporated herein by reference in its entirety.

TECHNICAL FIELD

Embodiments pertain to next generation (NG) wireless communications. In particular, some embodiments relate to measurement gap enhancements in new radio (NR) wireless systems.

BACKGROUND

The use and complexity of NG or NR wireless systems, which include 5G networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology, including complexities related to measurement gaps.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
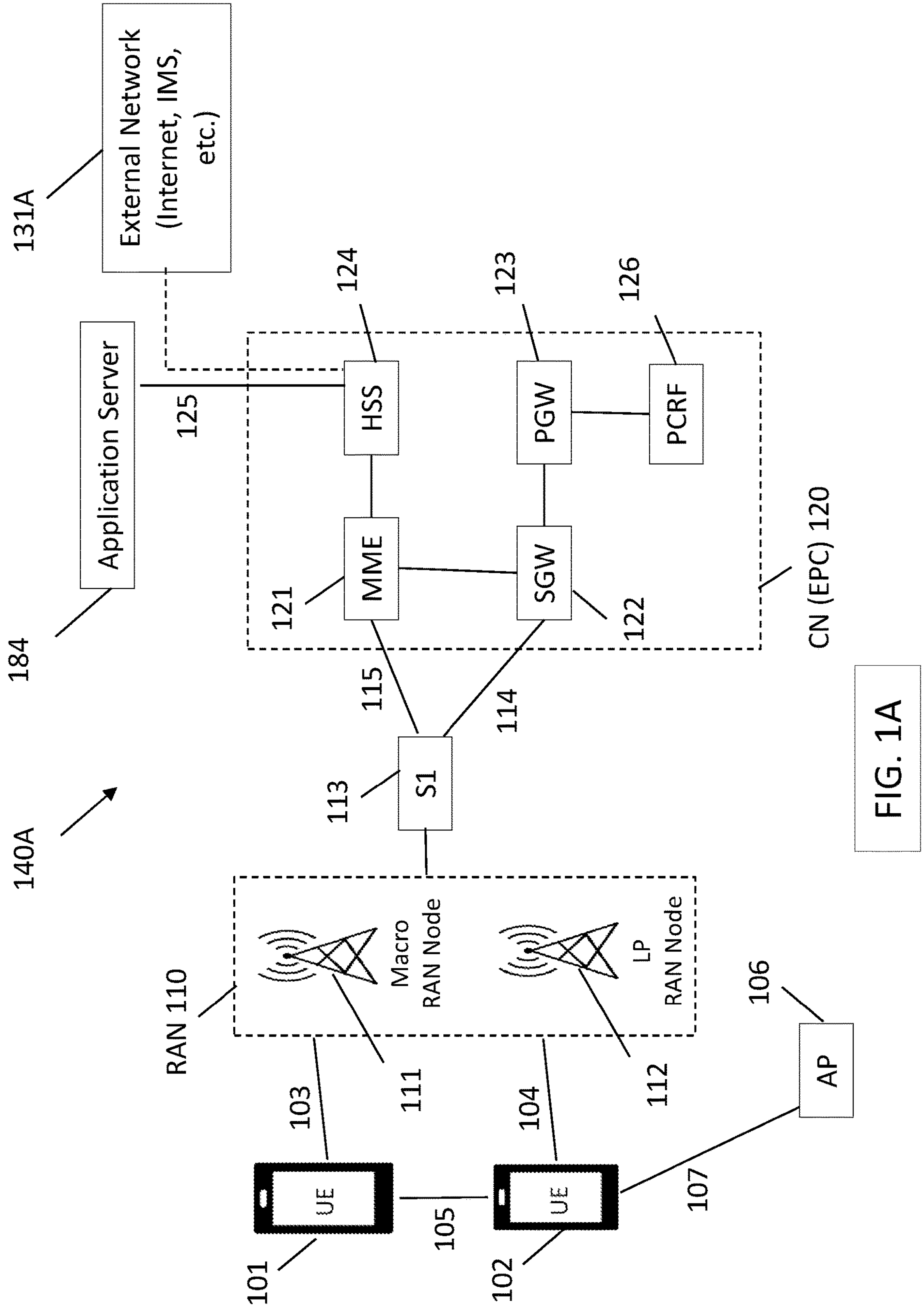
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and other frequencies and Spectrum Access System (SAS) in 3.55-3.7 GHZ and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IOT (eNB-IoT) UE and Further Enhanced (FeNB-IOT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS)

Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as 6th generation NodeBs—and thus may be alternately referred to as Radio Access Network NodeB (RANNB).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and front-haul (F) F1 interface. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and the DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
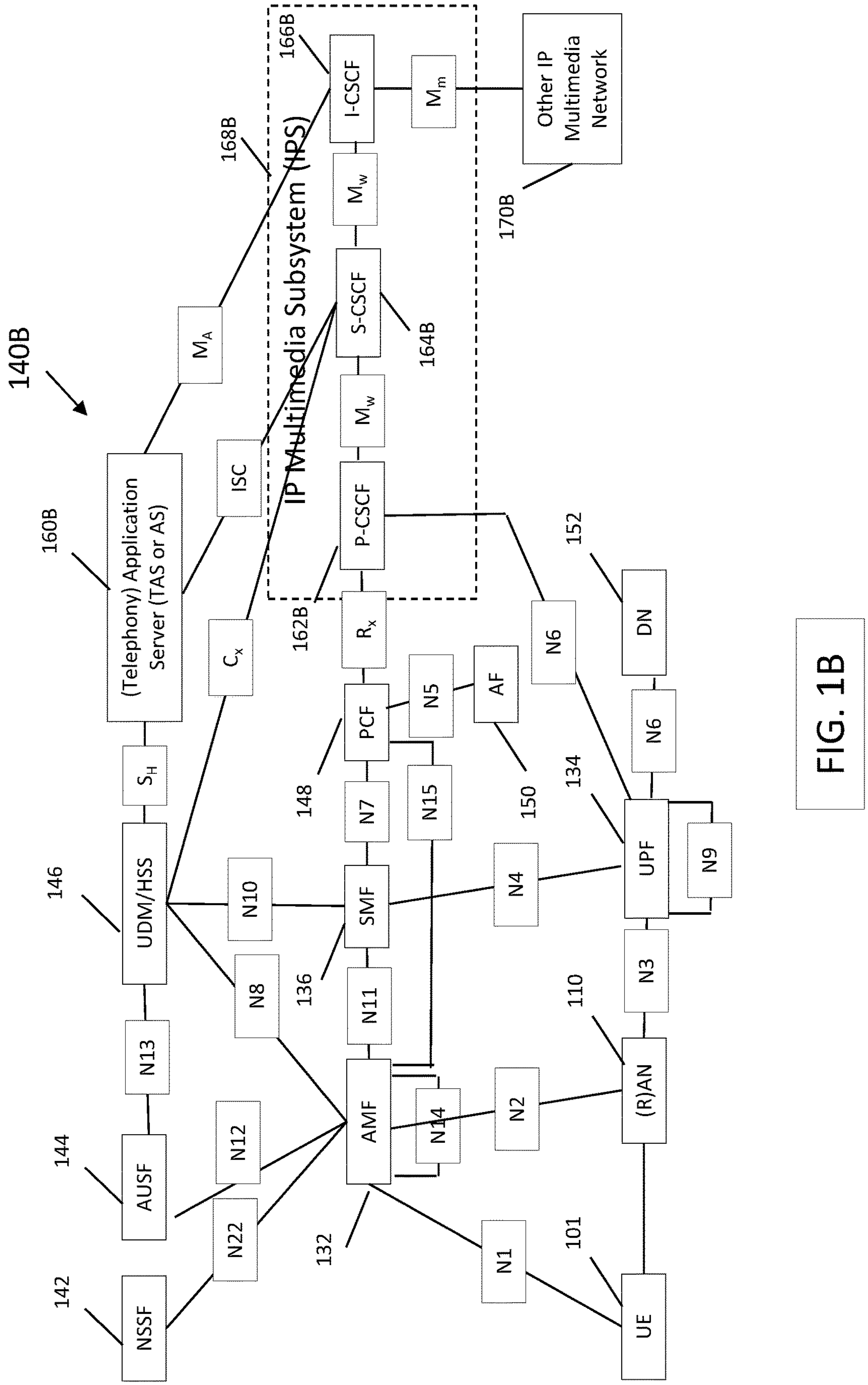
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
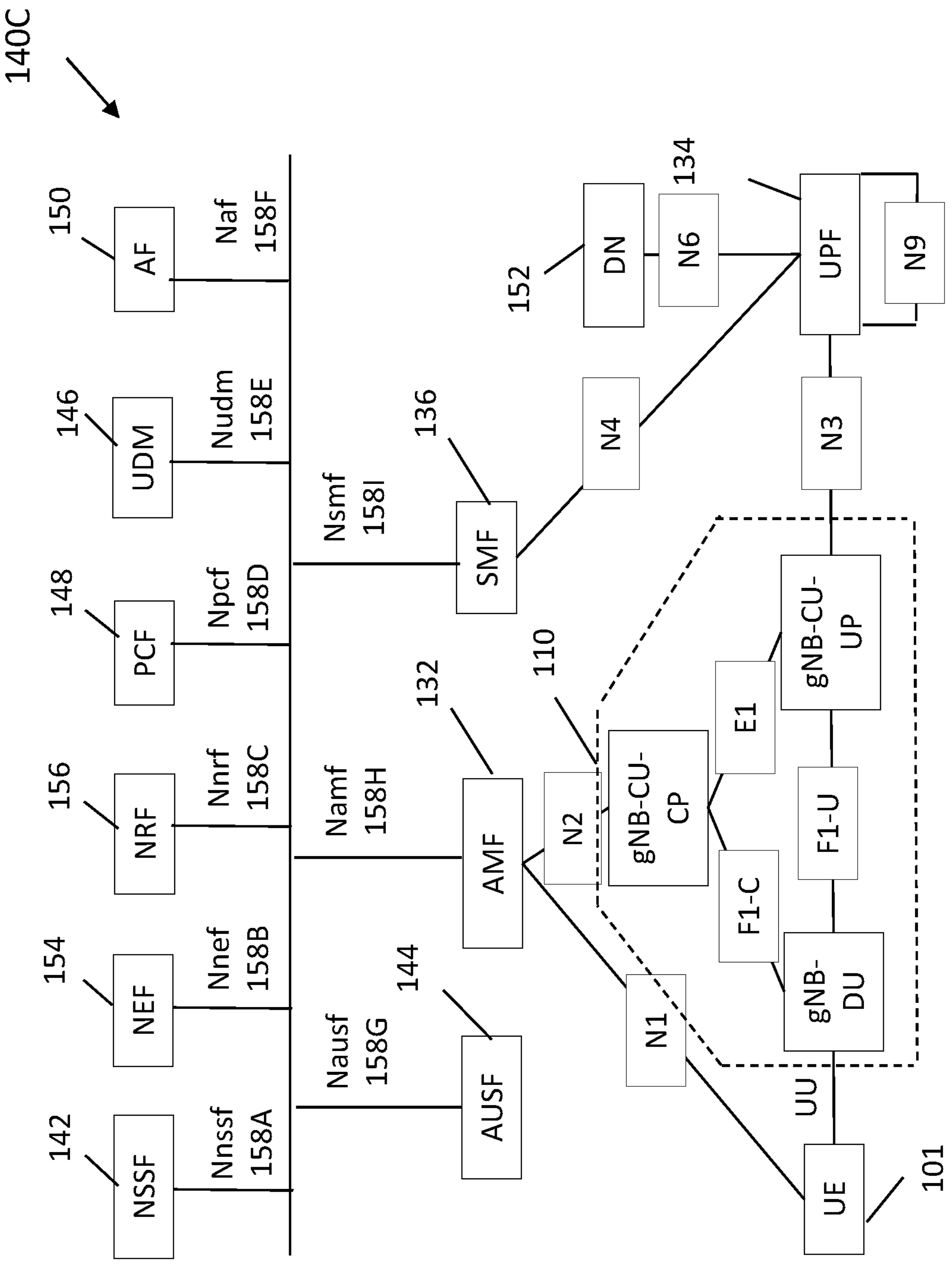
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
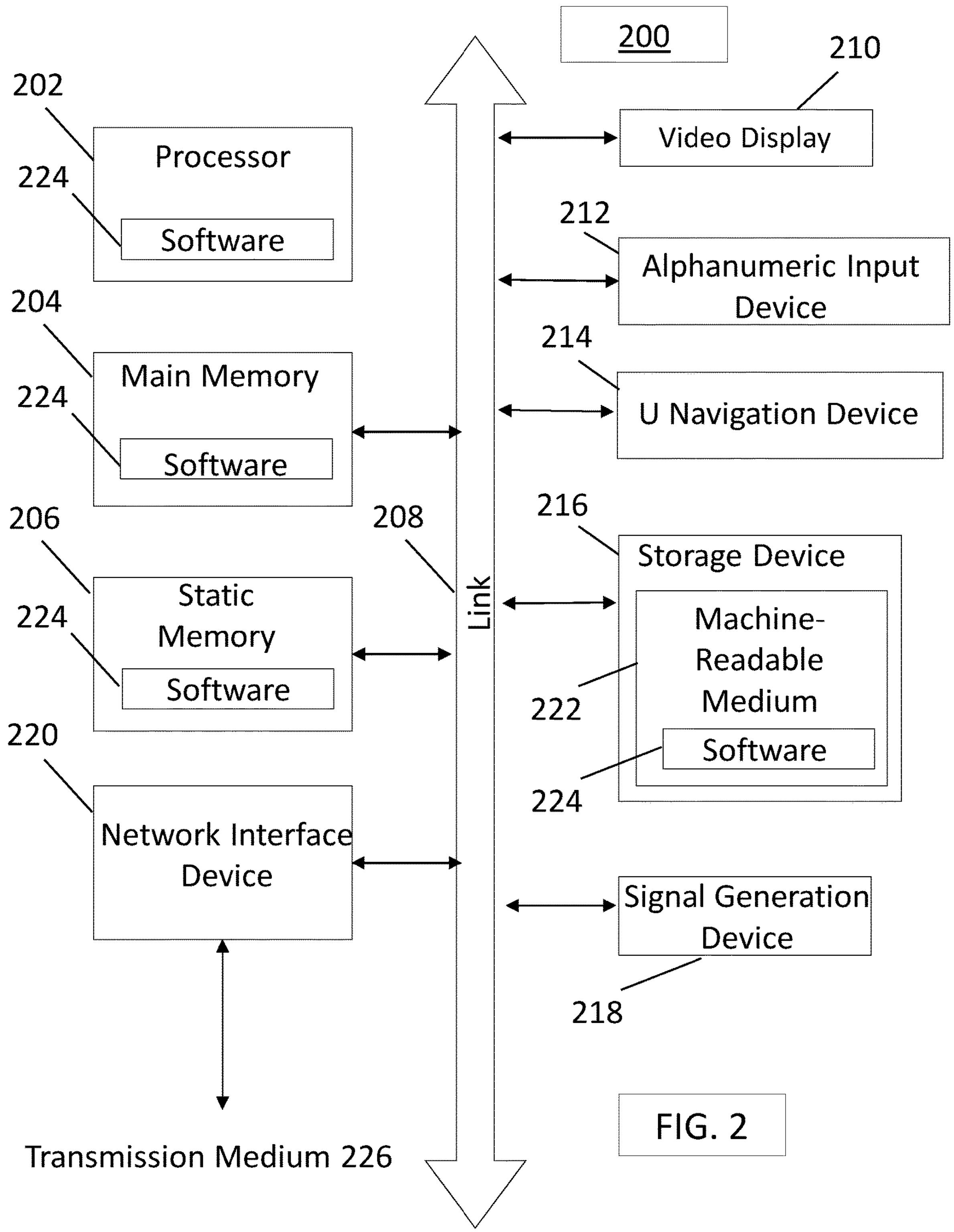
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5th generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System)

(W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, “car radio phone”), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHZ), ITS-G5C (i.e., Operation of ITS applications in the frequency range 5,470 GHz to 5,725 GHz)), DSRC in Japan in the 700 MHz band (including 715 MHz to 725 MHZ), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHZ and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHz, 2300-2400 MHZ, 2.4-2.4835 GHz (note: it is an ISM band with global availability and it is used by Wi-Fi technology family (11b/g/n/ax) and also by Bluetooth), 2500-2690 MHz, 698-790 MHZ, 610-790 MHz, 3400-3600 MHZ, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHZ, 3.5 GHz bands, 700 MHz bands, bands within the 24.25-86 GHz range, etc.), spectrum made available under FCC's “Spectrum Frontier” 5G initiative (including 27.5-28.35 GHz, 29.1-29.25 GHZ, 31-31.3 GHZ, 37-38.6 GHZ, 38.6-40 GHz, 42-42.5 GHZ, 57-64 GHZ, 71-76 GHZ, 81-86 GHz and 92-94 GHZ, etc), the ITS (Intelligent Transport Systems) band of 5.9 GHZ (typically 5.85-5.925 GHZ) and 63-64 GHz, bands currently allocated to WiGig such as WiGig Band 1 (57.24-59.40 GHz), WiGig Band 2 (59.40-61.56 GHZ) and WiGig Band 3 (61.56-63.72 GHZ) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHZ, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., lowithmedium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, measurement gaps are used for measurement of signaling system blocks (SSBs) or channel state information reference signals (CSI-RS) of neighbor cells. In particular, UEs performs measurements, transmission and reception of data using single RF module. One or more measurement gaps may each be used for intra-frequency, inter-frequency, or inter-RAT measurements.

To measure cells operating at different frequencies (inter-frequency measurements) and other RATs, the UE suspends communication with serving cell for a measurement gap to tune the RF module to the neighbor frequencies and measure the measurement signal from the neighbor cells. The UE then retunes to the serving cell and resumes communications with the serving cell after the measurement gap. Further, intra-frequency measurements may use a measurement gap in certain situations, for example, if the intra-frequency measurements are to be performed outside of the active bandwidth part (BWP) used for the serving cell.

Figure 3:
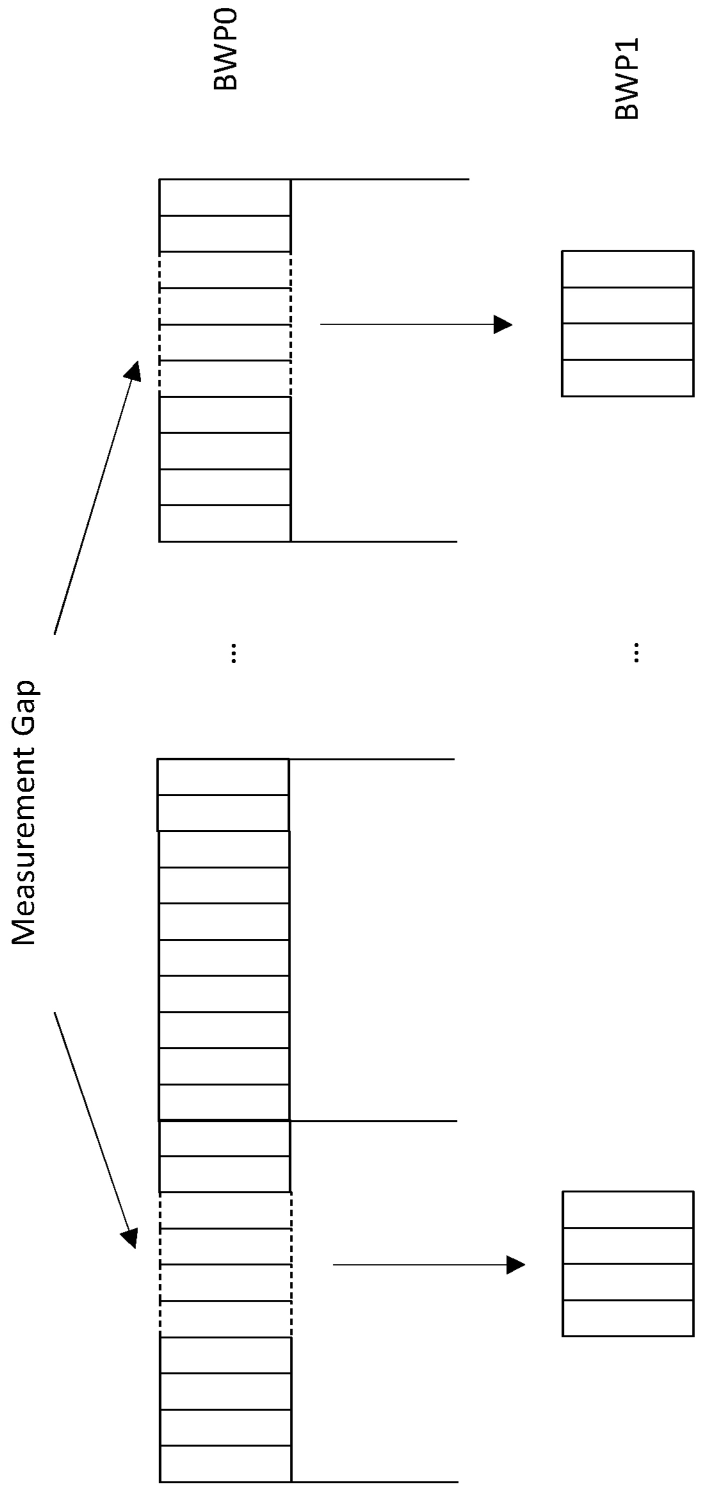
FIG. 3 illustrates a measurement gap in accordance with some embodiments.

In 5G NR, there are following three different measurement gap configurations related to FR1 frequency range1 (FR1) (4.1 GHz to 7.125 GHZ), FR2 (24.25 GHz to 52.6 GHz), or all frequencies. The serving cell provides the timing of each neighbor cell SSB using a SS/physical broadcast channel (PBCH) Block Measurement Timing Configuration (SMTC). FIG. 3 illustrates a measurement gap in accordance with some embodiments.

To configure the measurement gap, the gNB uses RRC signaling to provide the measurement gap pattern configuration to the UE, specifically using a MeasGapConfig information element (IE) within the MeasConfig IE in the RRC Reconfiguration message. The MeasGapConfig IE specifies both the measurement gap control information and the measurement gap configuration, including an offset of the gap pattern, and a length (Measurement Gap Length (MGL), a repetition period (Measurement Gap Repetition Period (MGRP)), and a timing advance of the measurement gap (Measurement Gap Timing Advance (MGTA).

A fast measurement gap configuration for a pre-configured measurement gap pattern has been approved in RAN4, RAN2. The Radio Resource Measurement requirements for the pre-configured measurement gap pattern include the mechanisms, rules, and behavior for activation/deactivation of the measurement gap following a downlink control information (DCI) or timer-based BWP switch, e.g., per BWP measurement gap configuration, as well as the measurement period requirements with the measurement gap pattern in the presence of one or more BWP switches per measurement period, and applicability, procedures and signaling for the measurement gap pattern.

Embodiment 1: 3GPP TS 38.306

In some embodiments, BWP switching may be one mandatory condition to activate the pre-configured measurement gap. Another condition may be that the ongoing measurements on the configured measurement objects (MOs) remains unchanged. Thus, both the UE and network may be aware that a measurement gap on the existing MOs is needed. As a result, the UE can perform the measurement using the measurement gap after that autonomously.

Both the UE and network have the same understanding of the need for the measurement gap for the measurements after BWP switching. Therefore, from both a signaling overhead and measurement latency reduction perspective, it may be better to activate the preconfigured measurement gaps autonomously. It is thus desirable to use autonomous/implicit activation for a preconfigured measurement gap triggered by DCI/timer-based BWP switching.

Alternatively, whether the preconfigured measurement gaps are valid, an ON/OFF bit including in the configuration IE for a pre-configured measurement gap can be used. That is, after the BWP switching, the network may enable the ON/OFF bit as “ON”. In order to guarantee a fast measurement with the pre-configured measurement gap, RRC signaling that includes the ON/OFF bit can be conveyed to the UE either only in response to a UE request or can be sent to the UE in an RRCReconfiguation IE during RRC reconfiguration.

In another embodiment, is thus feasible and efficient to use autonomous/implicit activation for a preconfigured measurement gap triggered by DCI/timer-based BWP switching and under preconfigured indications from the network.

Thus, the UE have two alternatives to determine whether there is available pre-configured measurement gap: the UE autonomously knows the pre-configured measurement gap activation status based on the rules aligned with the network, or the UE was indicated of the pre-configured measurement gap by the network. However, since only some UEs can support the first alternative, the network may be requested to forward an indication to the UE; the defined reporting requirements based on this network signaling may be followed by these UEs. To support autonomous knowledge of the pre-configured measurement gap activation status, the UE capability below may be introduced in TS 38.306 (in a UE capability IE sent from the UE to the network):

| Definitions for parameters | Per | M | FDD-TDD DIFF | FR1-FR2 DIFF |
|---|---|---|---|---|
| supportedPreMG<br>Indicates measurement gap pattern(s) optionally supported by the UE for pre-configurated gap | UE | CY | No | No |

-continued

| Definitions for parameters | Per | M | FDD-TDD DIFF | FR1-FR2 DIFF |
|---|---|---|---|---|
| supportedPreMGActivationAuto<br>Indicates the capability of UE support the autonomously know the pre-configured measurement gap activation status (on/off) | UE | CY | No | No |

Embodiment 2: TS 38.133 for UE Measurement Behavior and Requirements

When the UE does not support the capability of autonomous knowledge of the pre-configured measurement gap activation status, the network may indicate the pre-configured measurement gap activation status to the UE when the other conditions are triggered. As a result, the requirements on the measurement report can be different for UEs with different capabilities on supportedPreMGActivationAuto.

Stage 3 Details on Pre-Configured Measurement Gap Enhancement

Several cases may exist for a pre-configured measurement gap. In one case (Case 4), the network signals the pre-configured measurement gap (A+B in Q1) via RRC signaling; the UE then follows the BWP status (B) to activate/deactivate the measurement gap upon BWP switching.

In another case (Case 5), the network signals the pre-configured measurement gap (A in Q1) via RRC signaling; the UE then determines whether the pre-configured measurement gap should be activated upon BWP switching. For example, the pre-configured measurement gap is deactivated if the pre-configured measurement gap overlaps with the SSB, otherwise the pre-configured measurement gap is activated.

For the pre-configured measurement gap, the usefulness of MAC-CE based activation/deactivation has not been determined, and thus RAN2 prefers to not support such a mechanism. Issues regarding whether an FR1 gap and FR2 gap can be configured simultaneously in a pre-configured measurement gap, as well as whether a legacy measurement gap and pre-configured measurement gap be configured simultaneously still exist. A legacy measurement gap is configured by the gNB and immediately activated. A pre-configured measurement gap, on the other hand, may be configured by the gNB in a deactivated state then activated (or, deactivated if activated) in response to the UE demand for measurement within, or out of, the measurement gap.

Concurrent gaps are multiple measurement gaps, each concurrent gap pattern may be associated with one or more frequency layers. Each frequency layer can be associated with only one concurrent gap. Without considering the pre-configured measurement gap, concurrent gaps are always activated if set up by the network. No new gap pattern is introduced for a concurrent gap as the existing R15/R16 gap pattern may be configured for the concurrent gaps.

To clarify the frequency layer, positioning reference signal (PRS) measurements may be associated with one gap pattern, no matter how many frequencies are measured for the PRS. Each measured SSB or LTE frequency is considered as one frequency layer. Measured CSI-RS resources with the same center frequency may be considered as one frequency layer. It is possible to have Multiple MOs including CSI-RS resources with same center frequency. SSB and CSI-RS measurement in one MO are considered as different frequency layers.

It is still questionable whether a concurrent gap may be configured together with a legacy gap (i.e., a gap without associated frequency layer(s)). In addition, whether some of the concurrent gaps may be configured without an associated frequency layer is still at issue; if yes, a further question of how the UE uses the concurrent gaps together with gap without the associated frequency layer arises. Moreover, the number of concurrent gaps able to be configured is still an issues, as is whether concurrent gaps may be configured with different gap types (i.e., whether some gaps may be per-UE while others are Per-FR). In addition, the impact to the gap sharing configuration (MeasGapSharingConfig) due to concurrent gap is unclear, such as whether a multiple gap sharing configuration is able to be employed, as well as the applicability to Universal Terrestrial Radio Access (UTRA).

Pre-Configured Gap:

As above, in case 4 and 5, the BWP status is signalled to the UE. The UE then follows the gap activation/deactivation rule based on the BWP status. In case 5, the network indicates a pre-configured gap (A) via RRC signaling to the UE. Both the UE and the network may determine if the measurement gap is activated when the BWP is not overlapped with an SSB. The pre-configured measurement gap configuration parameters such as MGRP, MGL etc. may be the same as Rel-16 legacy measurement gap configuration parameters, there are different way to configure the pre-configured measurement gap: reuse the legacy measurement gap and use 1 bit to differentiate the pre-configured measurement gap, reuse the legacy measurement gap and use the BWP status to differentiate the pre-configured measurement gap, or not reuse the legacy measurement gap. In the first option (1 bit differentiation), the bit may be inside GapConfig where gapFR1, gapFR2 and gapUE are supported. The change is shown below:

MeasGapConfig information element

```
-- ASN1START
-- TAG-MEASGAPCONFIG-START
MeasGapConfig ::=                    SEQUENCE {
  gapFR2                             SetupRelease { GapConfig }
OPTIONAL, -- Need M
  ...,
  [[
  gapFR1                             SetupRelease { GapConfig }
OPTIONAL, -- Need M
```

-continued

MeasGapConfig information element

```
   gapUE                        SetupRelease { GapConfig }
OPTIONAL -- Need M
   ]]
}
GapConfig ::=                   SEQUENCE {
   gapOffset                    INTEGER (0..159),
   mgl                         ENUMERATED {ms1dot5, ms3, ms3dot5, ms4,
ms5dot5, ms6},
   mgrp                         ENUMERATED {ms20, ms40, ms80, ms160},
   mgta                         ENUMERATED {ms0, ms0dot25, ms0dot5},
   ...,
   [[
   refServCellIndicator            ENUMERATED {pCell, pSCell, mcg-FR2}
OPTIONAL -- Cond NEDCorNRDC
   ]],
   [[
   refFR2ServCellAsyncCA-r16         ServCellIndex
OPTIONAL, -- Cond AsyncCA
   mgl-r16                      ENUMERATED {ms10, ms20}
OPTIONAL -- Cond PRS
      ]],
      isPreconfigGap ::=              ENUMERATED {TRUE}
         OPTIONAL
}
-- TAG-MEASGAPCONFIG-STOP
-- ASN1STOP
```

Thus, as above, in some embodiments the isPreconfigGap parameter is added inside the GapConfig IE to indicate whether the measurement gap is a pre-configured measurement gap.

Simultaneous support of pre-configured gap and legacy gap: in some cases, pre-configured gapFR1 and gapFR2 may be configured simultaneously as well as with a legacy gap. In one embodiment, the structure can support simultaneous configuration for gapFR1 or/and gapFR2 or/and gapUE. In this case, a pre-configured measurement gap may be added as follows:

```
MeasGapConfig ::=           SEQUENCE {
   gapFR2                  SetupRelease { GapConfig }
OPTIONAL, -- Need M
   ...,
   [[
   gapFR1                  SetupRelease { GapConfig }
OPTIONAL, -- Need M
```

-continued

```
   gapUE                SetupRelease { GapConfig }
OPTIONAL -- Need M
      ]],
      [[
      preconfigGapUE          SetupRelease { GapConfig }
      OPTIONAL,
      preconfigGapFR1         SetupRelease { GapConfig }
      OPTIONAL,
      preconfigGapFR2         SetupRelease { GapConfig }
      OPTIONAL
      ]]
}
```

Thus, in some embodiments the preconfigGapUE, preconfigGapFR1, and/or preconfigGapFR2 parameter may be added in the MeasGapConfig IE.

Stage 3 Details for Case 4 and Case 5

In order to support case 4, in some embodiments only the BWP status is added per gap configuration.

MeasGapConfig information element

```
-- ASN1START
-- TAG-MEASGAPCONFIG-START
MeasGapConfig ::=               SEQUENCE {
   gapFR2                     SetupRelease { GapConfig }
OPTIONAL, -- Need M
   ...,
   [[
   gapFR1                     SetupRelease { GapConfig }
OPTIONAL, -- Need M
      gapUE                     SetupRelease { GapConfig }
OPTIONAL -- Need M
   ]]
}
GapConfig ::=                  SEQUENCE {
   gapOffset                   INTEGER (0..159),
   mgl                        ENUMERATED {ms1dot5, ms3, ms3dot5, ms4,
ms5dot5, ms6},
   mgrp                        ENUMERATED {ms20, ms40, ms80, ms160},
   mgta                       ENUMERATED {ms0, ms0dot25, ms0dot5},
   ...,
```

-continued

```
MeasGapConfig information element

  [[
  refServCellIndicator              ENUMERATED {pCell, pSCell, mcg-FR2}
OPTIONAL -- Cond NEDCorNRDC
  ]],
  [[
  refFR2ServCellAsyncCA-r16             ServCellIndex
OPTIONAL, -- Cond AsyncCA
  mgl-r16                       ENUMERATED {ms10, ms20}
OPTIONAL -- Cond PRS
    ]],
    isPreconfigGap ::=                ENUMERATED {TRUE},
      OPTIONAL
    bwpStatus ::= SEQUENCE (SIZE (1..maxNrofBWPs)) OF BOOLEAN,
        OPTIONAL
}
-- TAG-MEASGAPCONFIG-STOP
-- ASN1STOP
```

Thus, in some embodiments the bwpStatus parameter may be added in the gapConfig IE to indicate the activation of the pre-configured measurement gap.

Changes to TS 38.133

5.5 Measurements 5.5.1 Introduction

The network may configure an RRC_CONNECTED UE to perform measurements. The network may configure the UE to report them in accordance with the measurement configuration or perform conditional reconfiguration evaluation in accordance with the conditional reconfiguration. The measurement configuration is provided by means of dedicated signaling, i.e. using the RRCReconfiguration or RRCResume IE.

The network may configure the UE to perform the following types of measurements: NR measurements; Inter-RAT measurements of E-UTRA frequencies; and Inter-RAT measurements of UTRA-FDD frequencies.

The network may configure the UE to report the following measurement information based on SS/PBCH block(s): Measurement results per SS/PBCH block; Measurement results per cell based on SS/PBCH block(s); and SS/PBCH block(s) indexes.

The network may configure the UE to report the following measurement information based on CSI-RS resources: Measurement results per CSI-RS resource; Measurement results per cell based on CSI-RS resource(s); and CSI-RS resource measurement identifiers.

The network may configure the UE to perform the following types of measurements for NR sidelink and V2X sidelink: Constant Bit Rate (CBR) measurements.

The network may configure the UE to report the following Cross Link Interference (CLI) measurement information based on SRS resources: Measurement results per SRS resource; and SRS resource(s) indexes.

The network may configure the UE to report the following CLI measurement information based on CLI-RSSI resources: Measurement results per CLI-RSSI resource; and CLI-RSSI resource(s) indexes.

The measurement configuration includes the following parameters: Measurement objects; Reporting configurations; Measurement identities; Quantity configurations; and Measurement gaps.

Measurement objects: A list of objects on which the UE perform the measurements. For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting. The measObjectId of the MO which corresponds to each serving cell is indicated by servingCellMO within the serving cell configuration. For inter-RAT E-UTRA measurements a measurement object is a single E-UTRA carrier frequency. Associated with this E-UTRA carrier frequency, the network can configure a list of cell specific offsets and a list of 'blacklisted' cells. Blacklisted cells are not applicable in event evaluation or measurement reporting. For inter-RAT UTRA-FDD measurements a measurement object is a set of cells on a single UTRA-FDD carrier frequency. For CBR measurement of NR sidelink communication, a measurement object is a set of transmission resource pool(s) on a single carrier frequency for NR sidelink communication. For CLI measurements a measurement object indicates the frequency/time location of SRS resources and/or CLI-RSSI resources, and subcarrier spacing of SRS resources to be measured. The measGapId corresponds to the measurement gap configuration to apply during measurement for this measurement object if present.

Reporting configurations: A list of reporting configurations where there can be one or multiple reporting configurations per measurement object. Each measurement reporting configuration includes the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g., RSRP) and other associated information such as the maximum number of cells and the maximum number beams per cell to report.

In case of conditional reconfiguration, each configuration consists of the following: Execution criteria: the criteria the UE uses for conditional reconfiguration execution. RS type: the RS that the UE uses for obtaining beam and cell measurement results (SS/PBCH block-based or CSI-RS-based), used for evaluating conditional reconfiguration execution condition.

Measurement identities: For measurement reporting, a list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network. For conditional reconfiguration triggering, one measurement identity links to exactly one conditional reconfiguration trigger configuration. And up to 2 measurement identities can be linked to one conditional reconfiguration execution condition.

Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

Measurement gaps: Periods that the UE may use to perform measurements. There are the following types of measurement gap: single measurement gap: this is either a per UE gap or per FR gap; the UE always applies this gap when configured by the network. Pre-configured gap: UE only applies activated pre-configured gap for measurement; when pre-configured gap is deactivated, the UE performs measurement without gap.

5.5.2.9 Measurement Gap Configuration

The UE shall:

1> if gapFR1 is set to setup:

2> if an FR1 measurement gap configuration is already setup, release the FR1 measurement gap configuration;

2> setup the FR1 measurement gap configuration indicated by the measGapConfig in accordance with the received gapOffset, i.e., the first subframe of each gap occurs at an SFN and subframe meeting the following condition:

SFN mod $T$=FLOOR(gapOffset/10);

subframe=gapOffset mod 10;

with $T$=MGRP/10 as defined in TS 38.133;

2> apply the specified timing advance mgta to the gap occurrences calculated above (i.e. the UE starts the measurement mgta ms before the gap subframe occurrences);

2> if isPreconfigGap is included in gapConfig:

3> activate measurement gap according to pre-configured measurement gap procedure as described in 5.5.2.12;

1> else if gapFR1 is set to release:

2> release the FR1 measurement gap configuration;

1> if gapFR2 is set to setup:

2> if an FR2 measurement gap configuration is already setup, release the FR2 measurement gap configuration;

2> setup the FR2 measurement gap configuration indicated by the measGapConfig in accordance with the received gapOffset, i.e., the first subframe of each gap occurs at an SFN and subframe meeting the following condition:

SFN mod $T$=FLOOR(gapOffset/10);

subframe=gapOffset mod 10;

with $T$=MGRP/10 as defined in TS 38.133;

2> apply the specified timing advance mgta to the gap occurrences calculated above (i.e. the UE starts the measurement mgta ms before the gap subframe occurrences);

2> if isPreconfigGap is included in gapConfig:

3> activate measurement gap according to pre-configured measurement gap procedure as described in 5.5.2.12;

1> else if gapFR2 is set to release:

2> release the FR2 measurement gap configuration;

1> if gapUE is set to setup:

2> if a per UE measurement gap configuration is already setup, release the per UE measurement gap configuration;

2> setup the per UE measurement gap configuration indicated by the measGapConfig in accordance with the received gapOffset, i.e., the first subframe of each gap occurs at an SFN and subframe meeting the following condition:

SFN mod $T$=FLOOR(gapOffset/10);

subframe=gapOffset mod 10;

with $T$=MGRP/10 as defined in TS 38.133;

2> apply the specified timing advance mgta to the gap occurrences calculated above (i.e., the UE starts the measurement mgta ms before the gap subframe occurrences);

2> if isPreconfigGap is included in gapConfig:

3> activate measurement gap according to pre-configured measurement gap procedure as described in 5.5.2.12;

1> else if gapUE is set to release:

2> release the per UE measurement gap configuration.

NOTE 1: For gapFR2 configuration with synchronous CA, for the UE in NE-DC or NR-DC, the SFN and subframe of the serving cell indicated by the refServCellIndicator in gapFR2 is used in the gap calculation. Otherwise, the SFN and subframe of a serving cell on FR2 frequency is used in the gap calculation NOTE 2: For gapFR1 or gapUE configuration, for the UE in NE-DC or NR-DC, the SFN and subframe of the serving cell indicated by the refServCellIndicator in corresponding gapFR1 or gapUE is used in the gap calculation. Otherwise, the SFN and subframe of the PCell is used in the gap calculation.

NOTE 3: For gapFR2 configuration with asynchronous CA, for the UE in NE-DC or NR-DC, the SFN and subframe of the serving cell indicated by the refServCellIndicator and refFR2ServCellAsyncCA in gapFR2 is used in the gap calculation. Otherwise, the SFN and subframe of a serving cell on FR2 frequency indicated by the refFR2ServCellAsyncCA in gapFR2 is used in the gap calculation 5.5.2.12 Pre-Configured Measurement Gap Operation 1> if bwpstatus is included in gapConfig:

2> The UE shall activate the pre-configured measurement gap if configured and if the active BWP indicated in bwpstatus is FALSE. Otherwise, UE deactivate the pre-configured measurement gap to perform measurement.

1> else:

2> The UE shall activate the pre-configured measurement gap if configured and if the frequency location of the reference signals to be measured are not overlapping with any active BWPs. Otherwise, UE deactivates the pre-configured measurement gap to perform measurement.

6.3.2 Radio Resource Control Information Elements

MeasGapConfig

The IE MeasGapConfig specifies the measurement gap configuration and controls setup/release of measurement gaps.

MeasGapConfig information element

```
-- ASN1START
-- TAG-MEASGAPCONFIG-START
MeasGapConfig ::=                  SEQUENCE {
   gapFR2                         SetupRelease { GapConfig }
OPTIONAL, -- Need M
   ...,
   [[
   gapFR1                         SetupRelease { GapConfig }
OPTIONAL, -- Need M
   gapUE                          SetupRelease { GapConfig }
OPTIONAL -- Need M
   ]]
}
GapConfig ::=                      SEQUENCE {
   gapOffset                      INTEGER (0..159),
   mgl                           ENUMERATED {ms1dot5, ms3, ms3dot5, ms4,
ms5dot5, ms6},
   mgrp                          ENUMERATED {ms20, ms40, ms80, ms160},
   mgta                          ENUMERATED {ms0, ms0dot25, ms0dot5},
   ...,
   [[
   refServCellIndicator              ENUMERATED {pCell, pSCell, mcg-FR2}
OPTIONAL -- Cond NEDCorNRDC
   ]],
   [[
   refFR2ServCellAsyncCA-r16           ServCellIndex
OPTIONAL, -- Cond AsyncCA
   mgl-r16                        ENUMERATED {ms10, ms20}
OPTIONAL -- Cond PRS
   ]],
      [[
      isPreconfigGap-r17 ::=            ENUMERATED {TRUE}
                                    OPTIONAL,
      bwpStatus-r17 ::=                 SEQUENCE (SIZE (1..
maxNrofBWPs)) OF BOOLEAN,                 OPTIONAL
      ]]
}
-- TAG-MEASGAPCONFIG-STOP
-- ASN1STOP
```

MeasGapConfig field descriptions bwpStatus

Indicates if preconfigured should be activated when the BWP becomes current BWP.

gapFR1

Indicates measurement gap configuration that applies to FR1 only. In (NG)EN-DC, gapFR1 cannot be set up by NR RRC (i.e. only LTE RRC can configure FR1 measurement gap). In NE-DC, gapFR1 can only be set up by NR RRC (i.e. LTE RRC cannot configure FR1 gap). In NR-DC, gapFR1 can only be set up in the measConfig associated with MCG. gapFR1 can not be configured together with gapUE. The applicability of the FR1 measurement gap is according to Table 9.1.2-2 and Table 9.1.2-3 in TS 38.133 [14].

gapFR2

Indicates measurement gap configuration applies to FR2 only. In (NG)EN-DC or NE-DC, gapFR2 can only be set up by NR RRC (i.e. LTE RRC cannot configure FR2 gap). In NR-DC, gapFR2 can only be set up in the measConfig associated with MCG. gapFR2 cannot be configured together with gapUE. The applicability of the FR2 measurement gap is according -continued to Table 9.1.2-2 and Table 9.1.2-3 in TS 38.133 [14].

gapUE

Indicates measurement gap configuration that applies to all frequencies (FR1 and FR2). In (NG)EN-DC, gapUE cannot be set up by NR RRC (i.e. only LTE RRC can configure per UE measurement gap). In NE-DC, gapUE can only be set up by NR RRC (i.e. LTE RRC cannot configure per UE gap). In NR-DC, gapUE can only be set up in the measConfig associated with MCG. If gapUE is configured, then neither gapFR1 nor gapFR2 can be configured. The applicability of the per UE measurement gap is according to Table 9.1.2-2 and Table 9.1.2-3 in TS 38.133 [14].

gapOffset

-continued

Value gapOffset is the gap offset of the gap pattern with MGRP indicated in the field mgrp. The value range is from 0 to mgrp-1.

isPreconfiguredGap

Indicates measurement gap is preconfigured gap. UE activates the preconfigured gap when it is not overlap with the current BWP where the measured signal is in.

mgl

Value mgl is the measurement gap length in ms of the measurement gap. The measurement gap length is according to in Table 9.1.2-1 in TS 38.133 [14]. Value ms1dot5 corresponds to 1.5 ms, ms3 corresponds to 3 ms and so on. If mgl-r16 is present, UE shall ignore the mgl (without suffix).

mgrp

Value mgrp is measurement gap repetition period in (ms) of the measurement gap. The measurement gap repetition period is according to Table 9.1.2-1 in TS 38.133 [14].

bwpStatus

Indicates if preconfigured should be activated when the BWP becomes current BWP.

mgta

-continued

| |
|---|
| Value mgta is the measurement gap timing advance in ms. The applicability of the measurement gap timing advance is according to clause 9.1.2 of TS 38.133 [14]. Value ms0 corresponds to 0 ms, ms0dot25 corresponds to 0.25 ms and ms0dot5 corresponds to 0.5 ms. For FR2, the network only configures 0 ms and 0.25 ms. |
| refFR2ServCellAsyncCA |
| Indicates the FR2 serving cell identifier whose SFN and subframe is used for FR2 gap calculation for this gap pattern with asynchronous CA involving FR2 carrier(s). |
| refServCellIndicator |
| Indicates the serving cell whose SFN and subframe are used for gap calculation for this gap pattern. Value pCell corresponds to the PCell, pSCell corresponds to the PSCell, and mcg-FR2 corresponds to a serving cell on FR2 frequency in MCG. |

| Conditional Presence | Explanation |
|---|---|
| AsyncCA | This field is mandatory present when configuring FR2 gap pattern to UE in:<br>(NG)EN-DC or NR SA with asynchronous CA involving FR2 carrier(s);<br>NE-DC or NR-DC with asynchronous CA involving FR2 carrier(s), if the field refServCellIndicator is set to mcg-FR2.<br>In case the gap pattern to UE in NE-DC and NR-DC is already configured and the serving cell used for the gap calculation corresponds to a serving cell on FR2 frequency in MCG, then the field is optionally present, need M. Otherwise, it is absent, Need R. |
| NEDCorNRDC | This field is mandatory present when configuring gap pattern to UE in NE-DC or NR-DC. In case the gap pattern to UE in NE-DC and NR-DC is already configured, then the field is absent, need M. Otherwise, it is absent. |

-continued

| | |
|---|---|
| PRS | This field is optionally present, Need R, when configuring gap pattern to UE for measurements of DL-PRS configured via LPP (TS 37.355 [49]). Otherwise, it is absent. |

Concurrent Gap:

In some embodiments, the legacy measurement configuration is followed to signal concurrent gap inside the MeasGapConfig IE. There are two options to create addition concurrent gaps:

Option 1: adding a second concurrent gap in MeasGapConfig

```
MeasGapConfig ::=          SEQUENCE {
  gapFR2                   SetupRelease { GapConfig }
OPTIONAL, -- Need M
  ...,
  [[
  gapFR1                   SetupRelease { GapConfig }
OPTIONAL, -- Need M
  gapUE                    SetupRelease { GapConfig }
OPTIONAL -- Need M
    gap2UE,                  SetupRelease { GapConfig }
OPTIONAL
    gap2FR1,                 SetupRelease { GapConfig }
OPTIONAL
    gap2FR2                  SetupRelease { GapConfig }
OPTIONAL
    ]]
}
```

Option 2: Adding a List for Concurrent Gap in MeasGapConfig

```
MeasGapConfig ::=          SEQUENCE {
  gapFR2                   SetupRelease { GapConfig }
OPTIONAL, -- Need M
  ...,
  [[
  gapFR1                   SetupRelease { GapConfig }
OPTIONAL, -- Need M
  gapUE,                   SetupRelease { GapConfig }
OPTIONAL -- Need M
    concurrGapUEToAddModeList :: SEQUENCE (SIZE (1..maxConcurrGap))
OF GapConfig,
    concurrGapUEToReleaseList :: SEQUENCE (SIZE (1..maxConcurrGap)
OF GapConfig,
    concurrGapFR1ToAddModeList :: SEQUENCE (SIZE
(1..maxConcurrGap)) OF GapConfig,
    concurrGapFR1ToReleaseList :: SEQUENCE (SIZE (1..maxConcurrGap)
OF GapConfig,
    concurrGapFR2ToAddModeList :: SEQUENCE (SIZE
(1..maxConcurrGap)) OF GapConfig,
    concurrGapFR2ToReleaseList :: SEQUENCE (SIZE (1..maxConcurrGap)
OF GapConfig,
    ]]
}
```

The next detail is how to link the measurement gap to the MO and purpose according to RAN4 requirements. In some embodiments, the associated gaps may be indicated using a gap ID in the MO as follows:

```
GapConfig ::=                     SEQUENCE {
   gapOffset                      INTEGER (0..159),
   mgl                           ENUMERATED {ms1dot5, ms3, ms3dot5, ms4,
ms5dot5, ms6},
   mgrp                           ENUMERATED {ms20, ms40, ms80, ms160},
   mgta                          ENUMERATED {ms0, ms0dot25, ms0dot5},
   ...,
   [[
   refServCellIndicator              ENUMERATED {pCell, pSCell, mcg-FR2}
OPTIONAL -- Cond NEDCorNRDC
   ]],
   [[
   refFR2ServCellAsyncCA-r16             ServCellIndex
OPTIONAL, -- Cond AsyncCA
   mgl-r16                        ENUMERATED {ms10, ms20}
OPTIONAL -- Cond PRS
      ]],
      [[
      gapId                              INTEGER (0..MeasGapId)
      ]]
}
```

MeasGapId information element

```
-- ASN1START
-- TAG-MEASOBJECTID-START
MeasGapId ::=                     INTEGER (1..maxNrofMeasGapId)
-- TAG-MEASOBJECTID-STOP
-- ASNISTOP
MeasObjectNR ::=                    SEQUENCE {
   ssbFrequency                     ARFCN-ValueNR
OPTIONAL, -- Cond SSBorAssociatedSSB
   ssbSubcarrierSpacing                SubcarrierSpacing
OPTIONAL, -- Cond SSBorAssociatedSSB
   smtc1                          SSB-MTC
OPTIONAL, -- Cond SSBorAssociatedSSB
   smtc2                          SSB-MTC2
OPTIONAL, -- Cond IntraFreqConnected
   refFreqCSI-RS                      ARFCN-ValueNR
OPTIONAL, -- Cond CSI-RS
   referenceSignalConfig                 ReferenceSignalConfig,
   absThreshSS-BlocksConsolidation              ThresholdNR
OPTIONAL, -- Need R
   absThreshCSI-RS-Consolidation              ThresholdNR
OPTIONAL, -- Need R
   nrofSS-BlocksToAverage                  INTEGER (2..maxNrofSS-
BlocksToAverage)                     OPTIONAL, -- Need R
   nrofCSI-RS-ResourcesToAverage                INTEGER (2..maxNrofCSI-RS-
ResourcesToAverage)                  OPTIONAL, -- Need R
   quantityConfigIndex                  INTEGER (1..maxNrofQuantityConfig),
   offsetMO                      Q-OffsetRangeList,
   cellsToRemoveList                  PCI-List
OPTIONAL, -- Need N
   cellsToAddModList                   CellsToAddModList
OPTIONAL, -- Need N
   blackCellsToRemoveList                 PCI-RangeIndexList
OPTIONAL, -- Need N
   blackCellsToAddModList                 SEQUENCE (SIZE (1..maxNrofPCI-
Ranges)) OF PCI-RangeElement              OPTIONAL, -- Need N
   whiteCellsToRemoveList                 PCI-RangeIndexList
OPTIONAL, -- Need N
   whiteCellsToAddModList                 SEQUENCE (SIZE (1..maxNrofPCI-
Ranges)) OF PCI-RangeElement              OPTIONAL, -- Need N
   ...,
   [[
   freqBandIndicatorNR                  FreqBandIndicatorNR
OPTIONAL, -- Need R
   measCycleSCell                    ENUMERATED {sf160, sf256, sf320, sf512,
sf640, sf1024, sf1280} OPTIONAL -- Need R
   ]],
   [[
   smtc3list-r16                    SSB-MTC3List-r16
OPTIONAL, -- Need R
```

-continued

| MeasGapId information element | |
| --- | --- |
| rmtc-Config-r16 | SetupRelease {RMTC-Config-r16} |
| OPTIONAL, -- Need M | |
| t312-r16 | SetupRelease { T312-r16 } |
| OPTIONAL -- Need M | |
| ]], | |
| [[ | |
| associatedGap | AssociatedGap |
| OPTIONAL | |
| ]] | |
| } | |
| AssociatedGap :: | SEQUENCE { |
| measGapId | MeasGapId, |
| rsToMeasured | ENUMERATED {ssb, csi-rs} |
| } | |

| MeasObjectNR field descriptions |
| --- |
| associatedGap<br>Indicates the measurement gap and reference signal to be measured in this MO. |

5.5 Measurements 5.5.1 Introduction

The network may configure an RRC_CONNECTED UE to perform measurements. The network may configure the UE to report the measurements in accordance with the measurement configuration or perform conditional reconfiguration evaluation in accordance with the conditional reconfiguration. The measurement configuration is provided by means of dedicated signaling i.e., using the RRCReconfiguration or RRCResume.

The network may configure the UE to perform the following types of measurements: NR measurements; Inter-RAT measurements of E-UTRA frequencies; and Inter-RAT measurements of UTRA-FDD frequencies.

The network may configure the UE to report the following measurement information based on SS/PBCH block(s): Measurement results per SS/PBCH block; Measurement results per cell based on SS/PBCH block(s); and SS/PBCH block(s) indexes.

The network may configure the UE to report the following measurement information based on CSI-RS resources: Measurement results per CSI-RS resource; Measurement results per cell based on CSI-RS resource(s); and CSI-RS resource measurement identifiers.

The network may configure the UE to perform the following types of measurements for NR sidelink and V2X sidelink: CBR measurements.

The network may configure the UE to report the following CLI measurement information based on SRS resources: Measurement results per SRS resource; and SRS resource(s) indexes.

The network may configure the UE to report the following CLI measurement information based on CLI-RSSI resources: Measurement results per CLI-RSSI resource; and CLI-RSSI resource(s) indexes.

The measurement configuration includes the following parameters: Measurement objects; Reporting configurations; Measurement identities; Quantity configurations; and Measurement gaps.

Measurement objects: A list of objects on which the UE perform the measurements. For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting. The measObjectId of the MO which corresponds to each serving cell is indicated by servingCellMO within the serving cell configuration. For inter-RAT E-UTRA measurements a measurement object is a single E-UTRA carrier frequency. Associated with this E-UTRA carrier frequency, the network can configure a list of cell specific offsets and a list of 'blacklisted' cells. Blacklisted cells are not applicable in event evaluation or measurement reporting. For inter-RAT UTRA-FDD measurements a measurement object is a set of cells on a single UTRA-FDD carrier frequency. For CBR measurement of NR sidelink communication, a measurement object is a set of transmission resource pool(s) on a single carrier frequency for NR sidelink communication. For CLI measurements a measurement object indicates the frequency/time location of SRS resources and/or CLI-RSSI resources, and subcarrier spacing of SRS resources to be measured. The measGapId corresponds to the measurement gap configuration to apply during measurement for this measurement object if present.

Reporting configurations: A list of reporting configurations where there can be one or multiple reporting configurations per measurement object. Each measurement reporting configuration includes the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g., RSRP) and other associated information such as the maximum number of cells and the maximum number beams per cell to report.

In case of conditional reconfiguration, each configuration consists of the following: Execution criteria: the criteria the UE uses for conditional reconfiguration execution. RS type: the RS that the UE uses for obtaining beam and cell measurement results (SS/PBCH block-based or CSI-RS-based), used for evaluating conditional reconfiguration execution condition.

Measurement identities: For measurement reporting, a list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network. For conditional reconfiguration triggering, one measurement identity links to exactly one conditional reconfiguration trigger configuration. And up to 2 measurement identities can be linked to one conditional reconfiguration execution condition.

Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

Measurement gaps: Periods that the UE may use to perform measurements. There are the following types of measurement gap: single measurement gap: this is either a per UE gap or per FR gap; the UE always applies this gap when configured by the network. Concurrent gaps: the network may configure concurrent gaps which contain multiple measurement gap configuration to the UE. Each measurement gap can be linked to one or more measurement objects with a gap ID and RS type. The UE applies the corresponding gap for measurement on the linked measurement object to measure the specific RS type.

5.5.2.9 Measurement Gap Configuration

The UE shall:

1> if gapFR1 is set to setup; or

1> if the MeasGapConfig includes the concurrGapFR1ToAddModeList, for each GapConfig included in the concurrGapFR1ToAddModeList:

2> if an FR1 measurement gap configuration is already setup, release the FR1 measurement gap configuration;

2> setup the FR1 measurement gap configuration indicated by the measGapConfig in accordance with the received gapOffset, i.e., the first subframe of each gap occurs at an SFN and subframe meeting the following condition:

SFN mod $T$=FLOOR(gapOffset/10);

subframe=gapOffset mod 10;

with $T$=MGRP/10 as defined in TS 38.133;

2> apply the specified timing advance mgta to the gap occurrences calculated above (i.e. the UE starts the measurement mgta ms before the gap subframe occurrences);

1> else if gapFR1 is set to release; or

1> else if MeasGapConfig includes the concurrGapFR1ToReleaseList, for each GapConfig included in the concurrGapFR1ToReleaseList:

2> release the FR1 measurement gap configuration;

1> if gapFR2 is set to setup; or

1> if the MeasGapConfig includes the concurrGapFR2ToAddModeList, for each GapConfig included in the concurrGapFR2ToAddModeList:

2> if an FR2 measurement gap configuration is already setup, release the FR2 measurement gap configuration;

2> setup the FR2 measurement gap configuration indicated by the measGapConfig in accordance with the received gapOffset, i.e., the first subframe of each gap occurs at an SFN and subframe meeting the following condition:

SFN mod $T$=FLOOR(gapOffset/10);

subframe=gapOffset mod 10;

with $T$=MGRP/10 as defined in TS 38.133 [14];

2> apply the specified timing advance mgta to the gap occurrences calculated above (i.e. the UE starts the measurement mgta ms before the gap subframe occurrences);

1> else if gapFR2 is set to release; or

1> else if MeasGapConfig includes the concurrGapFR2ToReleaseList, for each GapConfig included in the concurrGapFR2ToReleaseList:

2> release the FR2 measurement gap configuration;

1> if gapUE is set to setup; or

1> if the MeasGapConfig includes the concurrGapUEToAddModeList, for each GapConfig included in the concurrGapUEToAddModeList:

2> if a per UE measurement gap configuration is already setup, release the per UE measurement gap configuration;

2> setup the per UE measurement gap configuration indicated by the measGapConfig in accordance with the received gapOffset, i.e., the first subframe of each gap occurs at an SFN and subframe meeting the following condition:

SFN mod $T$=FLOOR(gapOffset/10);

subframe=gapOffset mod 10;

with $T$=MGRP/10 as defined in TS 38.133 [14];

2> apply the specified timing advance mgta to the gap occurrences calculated above (i.e. the UE starts the measurement mgta ms before the gap subframe occurrences);

1> else if gapUE is set to release; or

1> else if MeasGapConfig includes the concurrGapUEToReleaseList, for each GapConfig included in the concurrGapUEToReleaseList:

2> release the per UE measurement gap configuration.

NOTE 1: For gapFR2 configuration with synchronous CA, for the UE in NE-DC or NR-DC, the SFN and subframe of the serving cell indicated by the refServCellIndicator in gapFR2 is used in the gap calculation. Otherwise, the SFN and subframe of a serving cell on FR2 frequency is used in the gap calculation NOTE 2: For gapFR1 or gapUE configuration, for the UE in NE-DC or NR-DC, the SFN and subframe of the serving cell indicated by the refServCellIndicator in corresponding gapFR1 or gapUE is used in the gap calculation. Otherwise, the SFN and subframe of the PCell is used in the gap calculation.

NOTE 3: For gapFR2 configuration with asynchronous CA, for the UE in NE-DC or NR-DC, the SFN and subframe of the serving cell indicated by the refServCellIndicator and refFR2ServCellAsyncCA in gapFR2 is used in the gap calculation. Otherwise, the SFN and subframe of a serving cell on FR2 frequency indicated by the refFR2ServCellAsyncCA in gapFR2 is used in the gap calculation 5.5.2.13 Concurrent Measurement Gaps Operation

TBD 6.3.2 Radio Resource Control Information Elements

MeasGapConfig

The IE MeasGapConfig specifies the measurement gap configuration and controls setup/release of measurement gaps.

MeasGapConfig information element

```
-- ASN1START
-- TAG-MEASGAPCONFIG-START
MeasGapConfig ::=                    SEQUENCE {
  gapFR2                             SetupRelease { GapConfig }
OPTIONAL, -- Need M
  ...,
  [[
  gapFR1                             SetupRelease { GapConfig }
OPTIONAL, -- Need M
  gapUE                              SetupRelease { GapConfig }
OPTIONAL -- Need M
  ]],
    [[
    concurrGapUEToAddModeList :: SEQUENCE (SIZE (1..maxConcurrGap))
OF GapConfig                                OPTIONAL,
    concurrGapUEToReleaseList :: SEQUENCE (SIZE (1..maxConcurrGap))
OF GapConfig                                OPTIONAL,
    concurrGapFR1ToAddModeList :: SEQUENCE (SIZE
(1..maxConcurrGap)) OF GapConfig
    OPTIONAL,
    concurrGapFR1ToReleaseList :: SEQUENCE (SIZE (1..maxConcurrGap))
OF GapConfig                                OPTIONAL,
    concurrGapFR2ToAddModeList :: SEQUENCE (SIZE
(1..maxConcurrGap)) OF GapConfig
    OPTIONAL,
    concurrGapFR2ToReleaseList :: SEQUENCE (SIZE (1..maxConcurrGap))
OF GapConfig                                OPTIONAL   ]]
}
GapConfig ::=                        SEQUENCE {
  gapOffset                          INTEGER (0..159),
  mgl                                ENUMERATED {ms1dot5, ms3, ms3dot5, ms4,
ms5dot5, ms6},
  mgrp                               ENUMERATED {ms20, ms40, ms80, ms160},
  mgta                               ENUMERATED {ms0, ms0dot25, ms0dot5},
  ...,
  [[
  refServCellIndicator               ENUMERATED {pCell, pSCell, mcg-FR2}
OPTIONAL -- Cond NEDCorNRDC
  ]],
  [[
  refFR2ServCellAsyncCA-r16          ServCellIndex
OPTIONAL, -- Cond AsyncCA
  mgl-r16                            ENUMERATED {ms10, ms20}
OPTIONAL -- Cond PRS
  ]],
    [[
    gapId                            INTEGER (0..MeasGapId)
    ]]
                                     OPTIONAL
}
-- TAG-MEASGAPCONFIG-STOP
-- ASN1STOP
```

| MeasGapConfig field descriptions |
|---|
| gapFR1<br>Indicates measurement gap configuration that applies to FR1 only. In (NG)EN-DC, gapFR1 cannot be set up by NR RRC (i.e. only LTE RRC can configure FR1 measurement gap). In NE-DC, gapFR1 can only be set up by NR RRC (i.e. LTE RRC cannot configure FR1 gap). In NR-DC, gapFR1 can only be set up in the measConfig associated with MCG. gapFR1 can not be configured together with gapUE. The applicability of the FR1 measurement gap is according to Table 9.1.2-2 and Table 9.1.2-3 in TS 38.133 [14]. |
| gapFR2<br>Indicates measurement gap configuration applies to FR2 only. In (NG)EN-DC or NE-DC, gapFR2 can only be set up by NR RRC (i.e. LTE RRC cannot configure FR2 gap). In NR-DC, gapFR2 can only be set up in the measConfig associated with MCG. gapFR2 cannot be configured together with gapUE. The applicability of the FR2 measurement gap is according to Table 9.1.2-2 and Table 9.1.2-3 in TS 38.133 [14]. |
| gapId<br>Indicates measurement gap id that will be used to associate with measurement object to be measured. |
| gapUE<br>Indicates measurement gap configuration that applies to all frequencies (FR1 and FR2). In (NG)EN-DC, gapUE cannot be set up by NR RRC (i.e. only LTE RRC can configure per UE measurement gap). In NE-DC, gapUE can only be set up by NR RRC (i.e. LTE RRC cannot configure per UE gap). In NR-DC, gapUE can only be set up in the measConfig associated with MCG. If gapUE is configured, then neither gapFR1 nor gapFR2 can be configured. The applicability of the per UE measurement gap is according to Table 9.1.2-2 and Table 9.1.2-3 in TS 38.133 [14]. |
| gapOffset<br>Value gapOffset is the gap offset of the gap pattern with MGRP indicated in the field mgrp. The value range is from 0 to mgrp-1. |
| mgl<br>Value mgl is the measurement gap length in ms of the measurement gap. The measurement gap length is according to in Table 9.1.2-1 in TS 38.133 [14]. Value ms1dot5 corresponds to 1.5 ms, ms3 corresponds to 3 ms and so on. If mgl-r16 is present, UE shall ignore the mgl (without suffix). |
| mgrp<br>Value mgrp is measurement gap repetition period in (ms) of the measurement gap. The measurement gap repetition period is according to Table 9.1.2-1 in TS 38.133 [14]. |
| mgta<br>Value mgta is the measurement gap timing advance in ms. The applicability of the measurement gap timing advance is according to clause 9.1.2 of TS 38.133 [14]. Value ms0 corresponds to 0 ms, ms0dot25 corresponds to 0.25 ms and ms0dot5 corresponds to 0.5 ms. For FR2, the network only configures 0 ms and 0.25 ms. |
| refFR2ServCellAsyncCA<br>Indicates the FR2 serving cell identifier whose SFN and subframe is used for FR2 gap calculation for this gap pattern with asynchronous CA involving FR2 carrier(s). |

-continued

| MeasGapConfig field descriptions |
|---|
| refServCellIndicator<br>Indicates the serving cell whose SFN and subframe are used for gap calculation for this gap pattern. Value pCell corresponds to the PCell, pSCell corresponds to the PSCell, and mcg-FR2 corresponds to a serving cell on FR2 frequency in MCG. |

| Conditional Presence | Explanation |
|---|---|
| AsyncCA | This field is mandatory present when configuring FR2 gap pattern to UE in:<br>(NG)EN-DC or NR SA with asynchronous CA involving FR2 carrier(s);<br>NE-DC or NR-DC with asynchronous CA involving FR2 carrier(s), if the field refServCellIndicator is set to mcg-FR2.<br>In case the gap pattern to UE in NE-DC and NR-DC is already configured and the serving cell used for the gap calculation corresponds to a serving cell on FR2 frequency in MCG, then the field is optionally present, need M. Otherwise, it is absent, Need R. |
| NEDCorNRDC | This field is mandatory present when configuring gap pattern to UE in NE-DC or NR-DC. In case the gap pattern to UE in NE-DC and NR-DC is already configured, then the field is absent, need M. Otherwise, it is absent. |
| PRS | This field is optionally present, Need R, when configuring gap pattern to UE for measurements of DL-PRS configured via LPP (TS 37.355 [49]). Otherwise, it is absent. |

MeasGapId

The IE MeasGapId is used to identify a measurement gap configuration, i.e., linking of a measurement object and a measurement gap configuration.

MeasGapId information element

```
-- ASN1START
-- TAG-MEASID-START
MeasGapId ::=          INTEGER (1..maxNrofMeasGapId)
-- TAG-MEASID-STOP
-- ASN1STOP
```

MeasObjectNR

The IE MeasObjectNR specifies information applicable for SS/PBCH block(s) intra/inter-frequency measurements and/or CSI-RS intra/inter-frequency measurements.

MeasObjectNR information element

```
-- ASN1START
-- TAG-MEASOBJECTNR-START
MeasObjectNR ::=                      SEQUENCE {
   ssbFrequency                       ARFCN-ValueNR
OPTIONAL, -- Cond SSBorAssociatedSSB
   ssbSubcarrierSpacing                    SubcarrierSpacing
OPTIONAL, -- Cond SSBorAssociatedSSB
   smtc1                           SSB-MTC
OPTIONAL, -- Cond SSBorAssociatedSSB
   smtc2                           SSB-MTC2
OPTIONAL, -- Cond IntraFreqConnected
   refFreqCSI-RS                        ARFCN-ValueNR
OPTIONAL, -- Cond CSI-RS
   referenceSignalConfig                   ReferenceSignalConfig,
   absThreshSS-BlocksConsolidation               ThresholdNR
OPTIONAL, -- Need R
   absThreshCSI-RS-Consolidation              ThresholdNR
OPTIONAL, -- Need R
```

-continued

MeasObjectNR information element

```
  nrofSS-BlocksToAverage                          INTEGER (2..maxNrofSS-
BlocksToAverage)                              OPTIONAL, -- Need R
  nrofCSI-RS-ResourcesToAverage                       INTEGER (2..maxNrofCSI-RS-
ResourcesToAverage)                           OPTIONAL, -- Need R
  quantityConfigIndex                         INTEGER (1..maxNrofQuantityConfig),
  offsetMO                             Q-OffsetRangeList,
  cellsToRemoveList                           PCI-List
OPTIONAL, -- Need N
  cellsToAddModList                           CellsToAddModList
OPTIONAL, -- Need N
  blackCellsToRemoveList                         PCI-RangeIndexList
OPTIONAL, -- Need N
  blackCellsToAddModList                          SEQUENCE (SIZE (1..maxNrofPCI-
Ranges)) OF PCI-RangeElement                     OPTIONAL, -- Need N
  whiteCellsToRemoveList                         PCI-RangeIndexList
OPTIONAL, -- Need N
  whiteCellsToAddModList                          SEQUENCE (SIZE (1..maxNrofPCI-
Ranges)) OF PCI-RangeElement                     OPTIONAL, -- Need N
  ...,
  [[
  freqBandIndicatorNR                         FreqBandIndicatorNR
OPTIONAL, -- Need R
  measCycleSCell                           ENUMERATED {sf160, sf256, sf320, sf512,
sf640, sf1024, sf1280} OPTIONAL -- Need R
  ]],
  [[
  smtc3list-r16                        SSB-MTC3List-r16
OPTIONAL, -- Need R
  rmtc-Config-r16                           SetupRelease {RMTC-Config-r16}
OPTIONAL, -- Need M
  t312-r16                            SetupRelease { T312-r16 }
OPTIONAL -- Need M
  ]],
    [[
    ]]
    associatedGap                                AssociatedGap
      OPTIONAL
]]}
AssociatedGap ::                                SEQUENCE {
    measGapId                                    MeasGapId,
    rsToMeasured                                 ENUMERATED {ssb, csi-rs}
}
```

| MeasObjectNR field descriptions |
| --- |
| absThreshCSI-RS-Consolidation<br>Absolute threshold for the consolidation of measurement results per CSI-RS resource(s) from L1 filter(s). The field is used for the derivation of cell measurement results as described in 5.5.3.3 and the reporting of beam measurement information per CSI-RS resource as described in 5.5.5.2. |
| absThreshSS-BlocksConsolidation<br>Absolute threshold for the consolidation of measurement results per SS/PBCH block(s) from L1 filter(s). The field is used for the derivation of cell measurement results as described in 5.5.3.3 and the reporting of beam measurement information per SS/PBCH block index as described in 5.5.5.2. |
| associatedGap<br>Indicates the measurement gap and reference signal to be measured in this MO. |
| blackCellsToAddModList<br>List of cells to add/modify in the black list of cells. It applies only to SSB resources. |
| blackCellsToRemove List<br>List of cells to remove from the black list of cells. |

Figure 4:
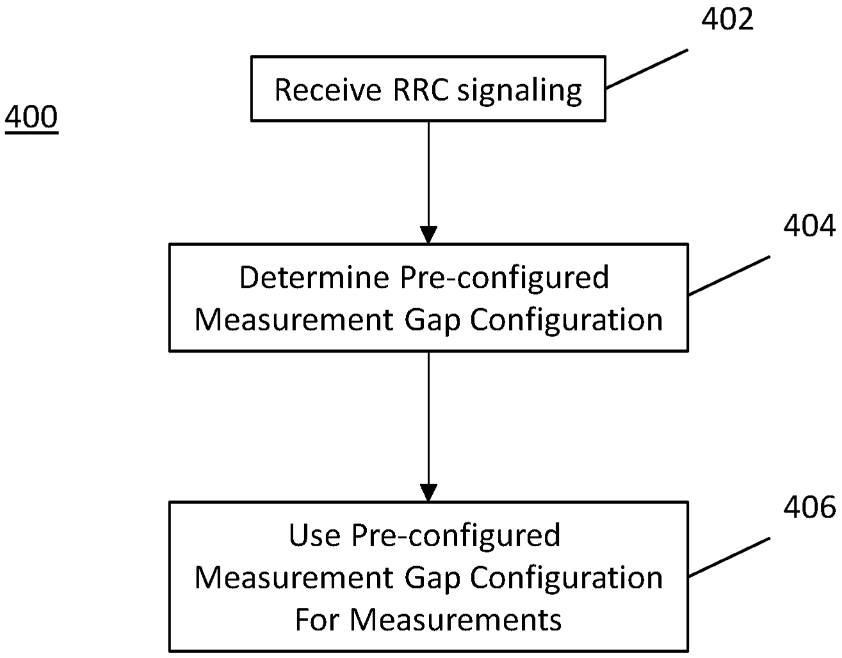
FIG. 4 illustrates a method of using a measurement gap in accordance with some embodiments.

FIG. 4 illustrates a method of using a measurement gap in accordance with some embodiments. Only some of the operations are shown, for convenience. Other operations may be present. At operation 402, a UE may receive RRC signaling. The RRC signaling may be any of the information elements described previously. At operation 404, the UE may determine from the RRC signaling one or more pre-configured measurement gap configurations as described above. At operation 406, the UE may use the one or more pre-configured measurement gap configurations to determine activation of one or more of the pre-configured measurement gaps and use the pre-configured measurement gaps to take measurements as described above.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term “embodiment” merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A user equipment (UE) comprising memory; and processing circuitry to configure the UE to:

send, to a 5$^{th}$ generation NodeB (gNB), UE capability information that indicates, using a first parameter, whether the UE supports a preconfigured measurement gap with a UE-autonomous mechanism for activation and deactivation and, using a second parameter, whether the UE supports a preconfigured measurement gap with a network-controlled mechanism for activation and deactivation;

determine, after switching to an active bandwidth part (BWP), whether a pre-configured measurement gap is activated or deactivated based on at least one of whether the UE supports the preconfigured measurement gap with the UE-autonomous mechanism for activation and deactivation and whether the UE supports the preconfigured measurement gap with the network-controlled mechanism for activation and deactivation;

receive, from the gNB after switching to the BWP, an indication of whether the pre-configured measurement gap is activated or deactivated, the indication of whether the pre-configured measurement gap is activated or deactivated in response to transmission of the second parameter without transmission of the first parameter;

in response to a determination that the pre-configured measurement gap is active, perform measurements based on the pre-configured measurement gap; and report the measurements to the gNB.

2. The UE of claim 1, wherein the UE capability information further includes a third parameter of whether the UE supports multiple measurement gap patterns with at least one preconfigured measurement gap.

3. The UE of claim 1, wherein the processing circuitry configures the UE to determine a status of the pre-configured measurement gap based on the UE-autonomous mechanism or based on the network-controlled mechanism.

4. The UE of claim 1, wherein the processing circuitry configures the UE to determine a status of the pre-configured measurement gap based on radio resource control (RRC) signaling from the gNB.

5. The UE of claim 1, wherein determination of a status of the pre-configured measurement gap associated with the first parameter based on the UE-autonomous mechanism is in response to at least one of receipt of downlink control information (DCI) indicating a BWP switch or expiration of a timer associated with the BWP switch.

6. The UE of claim 1, wherein the processing circuitry configures the UE to determine whether a measurement gap is the pre-configured measurement gap based on radio resource control (RRC) signaling from the gNB.

7. The UE of claim 1, wherein the processing circuitry configures the UE to determine whether the pre-configured measurement gap applies to frequency range 1 (FR1) only, FR2 only, or FR1 and F2 based on radio resource control (RRC) signaling from the gNB.

8. The UE of claim 7, wherein the processing circuitry configures the UE to determine, based on the RRC signaling that is separate from the indication. whether a plurality of concurrent pre-configured measurement gaps is simultaneously configured.

9. A 5$^{th}$ generation NodeB (gNB) comprising memory; and processing circuitry to configure the gNB to:

receive, from a user equipment (UE), UE capability information that indicates, using a first parameter, whether the UE supports a preconfigured measurement gap with a UE-autonomous mechanism for activation and deactivation and, using a second parameter, whether the UE supports a preconfigured measurement gap with a network-controlled mechanism for activation and deactivation;

determine whether to send, to the UE after the UE has switched to an active bandwidth part (BWP), an indication of whether a pre-configured measurement gap is activated or deactivated, the indication of whether the pre-configured measurement gap is activated or deactivated in response to transmission of the second parameter without transmission of the first parameter; and receive, from the UE, a measurement report that contains measurements based on the pre-configured measurement gap.

10. The gNB of claim 9, wherein the UE capability information further includes a third parameter of whether the UE supports multiple measurement gap patterns with at least one preconfigured measurement gap.

11. The gNB of claim 9, wherein the processing circuitry configures the gNB to indicate a status of the pre-configured measurement gap based on radio resource control (RRC) signaling.

12. The gNB of claim 9, wherein determination of a status of the pre-configured measurement gap associated with the first parameter based on the UE-autonomous mechanism is in response at least one of transmission of downlink control information (DCI) indicating a BWP switch or expiration of a timer associated with the BWP switch.

13. A non-transitory computer-readable storage medium that stores instructions for execution by one or more processors of an apparatus of a user equipment (UE), the instructions, when executed, configured to cause the apparatus to:

send, to a $5^{th}$ generation NodeB (gNB), UE capability information that includes at least one of a first parameter that indicates whether the UE supports a preconfigured measurement gap with a UE-autonomous mechanism for activation and deactivation or a second parameter that indicates whether the UE supports a preconfigured measurement gap with a network-controlled mechanism for activation and deactivation;

determine, after switching to an active bandwidth part (BWP), whether a pre-configured measurement gap is activated or deactivated based on at least one of whether the UE supports the preconfigured measurement gap with the UE-autonomous mechanism for activation and deactivation or whether the UE supports the preconfigured measurement gap with the network-controlled mechanism for activation and deactivation;

receive, from the gNB after switching to the BWP, an indication of whether the pre-configured measurement gap is activated or deactivated, the indication of whether the pre-configured measurement gap is activated or deactivated in response to transmission of the second parameter without transmission of the first parameter:

in response to a determination that the pre-configured measurement gap is active, perform measurements based on the pre-configured measurement gap, and report the measurements to the gNB.

14. The non-transitory computer-readable storage medium of claim 13, wherein the UE capability information further includes a third parameter of whether the UE supports multiple measurement gap patterns with at least one preconfigured measurement gap.

15. The non-transitory computer-readable storage medium of claim 13, wherein the instructions, when executed, cause the apparatus to determine a status of the pre-configured measurement gap based on radio resource control (RRC) signaling from the gNB.

16. The non-transitory computer-readable storage medium of claim 13, wherein determination of a status of the pre-configured measurement gap associated with the first parameter based on the UE-autonomous mechanism is in response at least one of transmission of downlink control information (DCI) indicating a BWP switch or expiration of a timer associated with the BWP switch.

17. The UE of claim 1, wherein the processing circuitry configures the UE to:

upon switching to the active BWP, autonomously determine that the pre-configured measurement gap is deactivated when all measurements configured on measurement objects associated with the pre-configured measurement gap are performable within the active BWP without using the pre-configured measurement gap, and autonomously determine that the pre-configured measurement gap is activated when at least one measurement configured on a measurement object associated with the pre-configured measurement gap is not performable within the active BWP without using the pre-configured measurement gap.

18. The UE of claim 1, wherein the processing circuitry configures the UE to:

in response to both the first parameter and the second parameter being indicated in the UE capability information and the gNB providing an activation status indication for all downlink BWPs of all activated component carriers and for all deactivated secondary component carriers, determine an activation and deactivation status of the pre-configured measurement gap based on the activation status indication rather than based on autonomous determination, and in response to the gNB not providing the activation status indication for all downlink BWPs of all activated component carriers and for all deactivated secondary component carriers, determine the activation and deactivation status of the pre-configured measurement gap based on the autonomous determination.

19. The UE of claim 1, wherein:

the processing circuitry configures the UE to identify the pre-configured measurement gap as distinct from a legacy measurement gap based on a pre-configured gap indicator received in radio resource control (RRC) signaling from the gNB, the legacy measurement gap is activated immediately upon configuration by the gNB, and the pre-configured measurement gap is configured in a deactivated state and subsequently activated or deactivated based on the first parameter or the second parameter.

20. The UE of claim 1, wherein the processing circuitry configures the UE to:

in response to the second parameter being indicated in the UE capability information without the first parameter, apply a gap interruption requirement during the pre-configured measurement gap in response to the indication received from the gNB indicating the pre-configured measurement gap is activated, and refrain from applying the gap interruption requirement and remain available for scheduling by the gNB during occasions of the pre-configured measurement gap in response to the indication indicating the pre-configured measurement gap is deactivated.

* * * * *